Oct. 24, 1972     C. W. PIERSON     3,700,532

ULTRASONIC SPLICING

Original Filed July 15, 1968

CHARLES W. PIERSON
INVENTOR.

BY *Henry M. Chapin*

ATTORNEYS

United States Patent Office 3,700,532
Patented Oct. 24, 1972

3,700,532
ULTRASONIC SPLICING
Charles W. Pierson, Rochester, N.Y., assignor to
Eastman Kodak Company, Rochester, N.Y.
Original application July 15, 1968, Ser. No. 744,817, now
Patent No. 3,519,507, dated July 7, 1970. Divided
and this application Dec. 4, 1969, Ser. No. 870,529
Int. Cl. B32b 31/20; B23k 27/00
U.S. Cl. 156—580
1 Claim

ABSTRACT OF THE DISCLOSURE

Splicing the overlapping ends of thermoplastic moving picture films between an anvil and an ultrasonic horn which have plane non parallel surfaces inclined at an acute angle to one another. This eliminates the embrittlement which occurs when the horn and anvil have parallel surfaces.

BACKGROUND OF THE INVENTION

Field of the invention

This is a division of application Ser. No. 744,817 filed July 15, 1968, now Pat. No. 3,519,507, issued July 7, 1970.

The present invention relates to a novel ultrasonic method of and apparatus for splicing together two lengths of thermoplastic film, such as moving picture film.

The prior art

In the moving picture film industry it is frequently necessary to splice together two lengths of moving picture film, as when a film has broken, or when a leader must be spliced onto the end of a film. This has been done in various ways, as by using adhesives, or by overlapping end portions of the two lengths of film and applying ultrasonic vibrations thereto to cause the thermoplastic film to soften and the two ends to unite. While splices can be effectively made by ultrasonic techniques, I have found that when using the technique of the prior art wherein vibrations are imparted by an ultrasonic transducer horn having a plane surface which is parallel to the film and the underlying anvil, there is a tendency for embrittlement of the film to occur in the immediate area of the splice on one side on an area of the top film which is spaced from its cut end and is located adjacent the cut end of the bottom film. Such embrittlement can cause the film to part at the splice while being run through a motion picture camera or other reeling device. I have found this to be particularly troublesome with two lengths of cellulose acetate film.

SUMMARY OF THE INVENTION

In accordance with the present invention, I have improved upon the ultrasonic splicing method of the prior art by positioning a first end portion of a first length of film in overlapping contact with a second end portion of the second length of film, for example, with an overlap of ⅛ or 3/16 inch. The overlapping films are positioned on an anvil having a plane surface in uniform contact with one of the portions. An ultrasonic horn is positioned on the opposite side adjacent to the other portion of film and has a plane surface which is desirably inclined relative to the anvil surface at an angle up to 45°. Excellent results have been secured at an acute angle between 2 and 5° with film between 0.001 and 0.015 inch. Larger angles should be used with thicker films. Then ultrasonic vibrations are applied to the horn for a brief period of time to fuse the first and second end portions together. I have found that strong splices are obtained in this way and that they are free from embrittlement adjacent to the splice. This is of particular importance for cellulose acetate films which exhibited decided embrittlement when joined in accordance with the prior art.

THE DRAWING

The invention will be described in more detail with reference to the drawings wherein.

THE PREFERRED EMBODIMENTS

Figure 1:
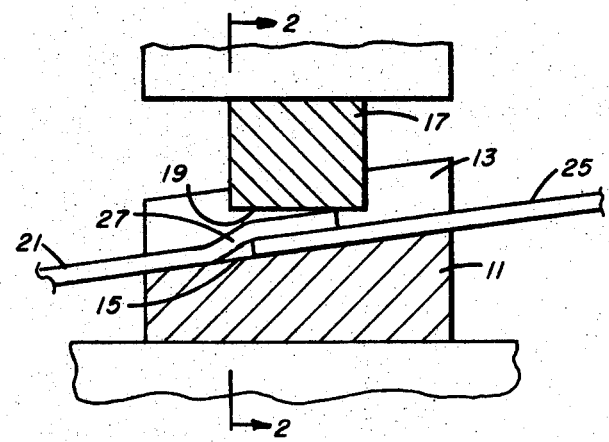
FIG. 1 is a vertical sectional view, parts being in elevation, of an ultrasonic splicing apparatus in accordance with the invention.
Figure 2:
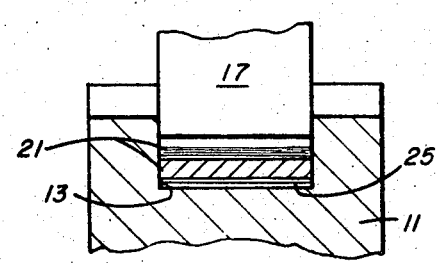
FIG. 2 is a cross-sectional view taken along the line 2—2 in FIG. 1.

Referring to FIGS. 1 and 2, there is shown an anvil 11 of steel or other suitable metal, having a channel 13 in the top surface thereof, with the bottom surface 15 being inclined at an acute angle to the horizontal. A metallic ultrasonic transducer horn 17 is positioned above the surface 15 and has a plane surface 19 which is horizontal, and thus is inclined at an acute angle with respect to the inclined surface 15. Two lengths, 21 and 25, of cellulose acetate moving picture film of 8 mm. width, are positioned within the channel 13 with their ends in overlapping relation between the plane surfaces 15 and 19.

When the splice is to be effected, the horn 17 is moved into position in contact with the upper film surface over an area at least as great as the area of overlap and ultrasonic vibrations are imparted to the horn 17 so as to cause the thermoplastic film material to soften and the two end portions to unite into a strong and non-brittle splice of substantially the same thickness as the original films. After a short time, of the order of about one second or less, (e.g. 0.3 or 0.4 second), the ultrasonic vibrations are then discontinued, the splice cools so that the softened plastic hardens, the horn 17 is withdrawn, and the spliced film is removed for replacement with the next films to be spliced.

Figure 3:
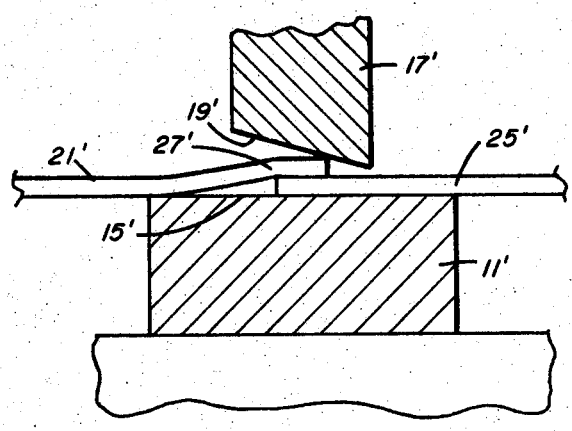
FIG. 3 is a vertical sectional view, parts being in elevation, showing a modified arrangement of ultrasonic splicing apparatus in accordance with the invention.

In FIG. 3 there is shown a modification wherein the anvil 11' has a top surface 15' which is substantially horizontal, and wherein the horn 17' has a plane bottom surface 19' which is inclined to the horizontal at an acute angle, and thus is similarly inclined to the surface 15'. When ultrasonic vibrations are applied to the horn 17', a strong non-brittle splice is obtained, as described in connection with FIGS. 1 and 2.

By the described procedures there is obtained a strong splice which is not brittle at the areas 27 and 27', as is the case when parallel horn and anvil surfaces are employed. This improvement is believed due to the existence of a gradient such that the most severe vibration occurs at the cut edge of the top film, and the least amount of vibration occurs above the cut edge of the bottom film. The strength of splices has been appraised by bending the spliced film in a small radius. Film spliced by the present invention withstands such bending, whereas film spliced between parallel surfaces fractures at the points 27 and 27'.

The ultrasonic vibrations can be generated in any suitable way, as is well known to the ultrasonics art. Reference is made to the U.S. Patent 3,022,814 of A. G. Bodine, Jr., which describes both magnetostrictive vibration generators and piezoelectric vibration generators which are suitable for the present invention. Generally, there are used between 20,000 and 40,000 cycles per second, but higher or lower values can be used.

The principles of the invention have been described by way of illustration, as applied to the splicing of cellulose acetate moving picture film. It is to be understood, however, that splicing in the manner described can be performed successfully with other types of thermoplastic materials which are well known to the film art, among which may be mentioned cellulose nitrate, polyethylene, polyethylene terephthalate, polyvinyl chloride, copolymers of polyvinylchloride and polyvinyl acetate, and polyvinylidene chloride. Successful results can be secured with films of these and other thermoplastic materials of any commercially available thickness, such as from 0.001 inch up to 0.015 inch.

Generally, splicing is accomplished with the apparatus shown, wherein relative movement is effected between an upper horn and a lower anvil. However, the principles also apply when other relationships are used, such as a lower horn and an upper anvil; or a side-by-side relationship and lateral movement.

The invention has been described in detail with particular reference to preferred embodiments thereof, but it will be understood that variations and modifications can be effected within the spirit and scope of the invention as described hereinabove, and as defined in the appended claim.

I claim:

1. Apparatus for ultrasonically splicing together two lengths of material comprising thermoplastic surfaces, said apparatus comprising in combination:

an anvil having a narrow channel therein with upstanding side walls, said channel being adapted to receive and laterally restrain two overlapping lengths of material to be spliced, the bottom of said channel comprising a plane surface portion;

an ultrasonic transducer horn having a plane surface portion inclined at an acute angle of 2–5 degrees relative to said plane anvil surface portion, said horn fitting snugly within said channel with the sides thereof closely adjacent to said upstanding side walls of said channel whereby said horn is adapted to engage the entire width of said overlapping lengths of material to form a splice, said anvil and said horn being relatively movable toward and away from one another into and out of splicing engagement with said two lengths of material; and means for ultrasonically vibrating said horn.

References Cited
UNITED STATES PATENTS

Re. 25,033    8/1961    Balamuth et al.
3,121,353    2/1964    Scarpa et al. _____ 228—1
3,523,845    8/1970    Robertson.

BENJAMIN A. BORCHELT, Primary Examiner

J. DEWITT, Assistant Examiner

U.S. Cl. X.R.

156—73, 507; 228—1